Patented Dec. 27, 1927.

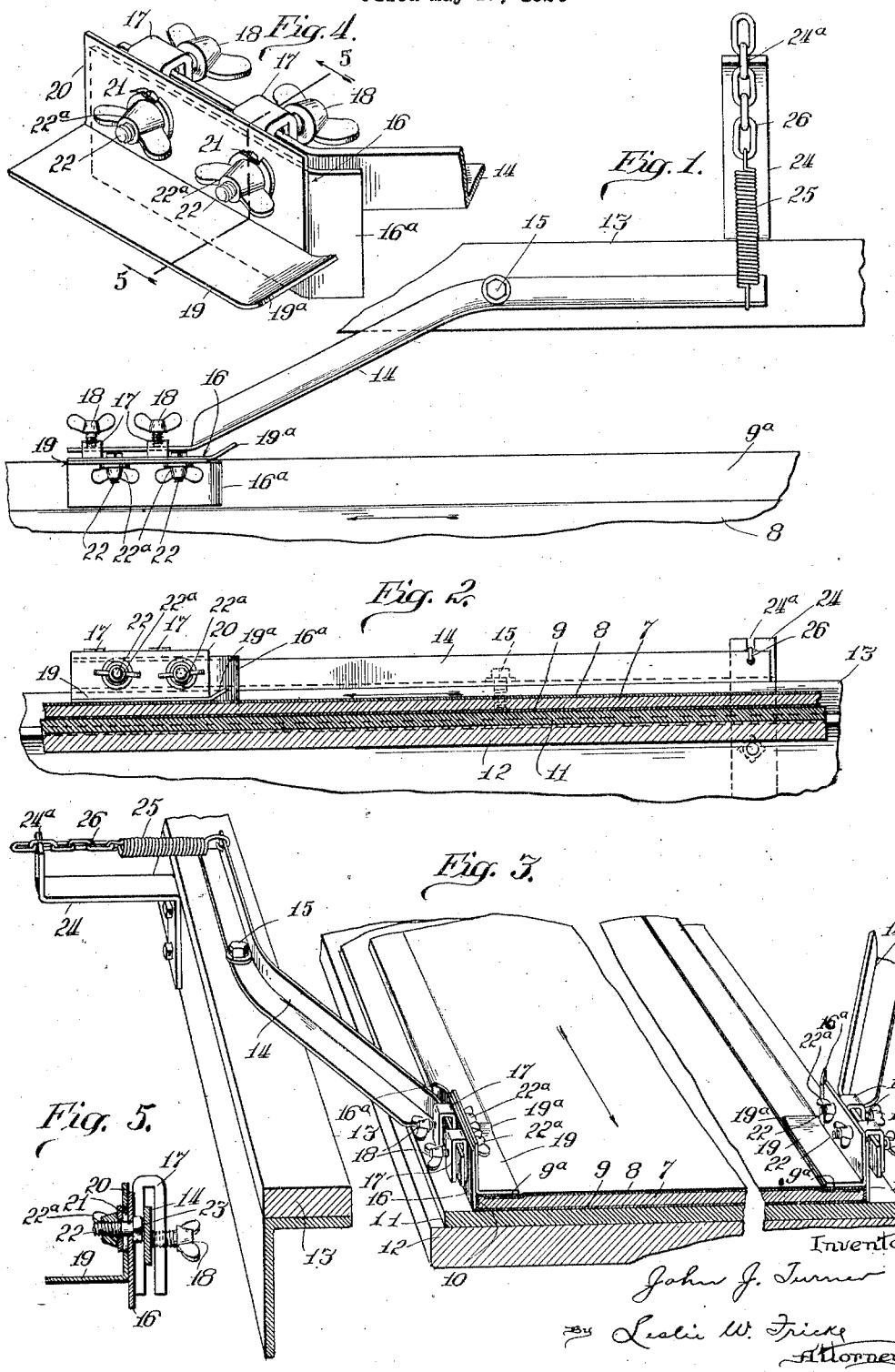
Dec. 27, 1927.
J. J. TURNER
1,654,024
APPARATUS FOR SHAPING THE EDGES OF WALL BOARD OR THE LIKE
Filed May 17, 1924

1,654,024

UNITED STATES PATENT OFFICE.

JOHN J. TURNER, OF BATAVIA, NEW YORK, ASSIGNOR TO UNIVERSAL GYPSUM & LIME CO., OF CHICAGO, ILLINOIS, A CORPORATION OF DELAWARE.

APPARATUS FOR SHAPING THE EDGES OF WALL BOARD OR THE LIKE.

Application filed May 17, 1924. Serial No. 713,960.

This invention relates to apparatus for shaping the edges of wall board or the like.

Wall board is used principally as a substitute for lath and plaster in the finishing of interior walls. It is important that the board be of uniform thickness and that the edges be true and square so that adjacent boards may be brought into abutting position with as little space as possible between their meeting edges.

The manufacture of wall board is ordinarily continuously carried out by advancing, in spaced relation, two covering sheets between which a plastic material capable of setting into a rock-like mass is placed. The board may be formed with open edges at its sides, in which case the two sheets of covering material are of substantially the same width; or, it may be formed with enclosed edges at its sides, in which case one of the covering sheets is usually of sufficient width to permit its marginal portions to be turned around the edges of the plastic material and to be brought into lapping engagement with the marginal portions of the other sheet. The plastic material is usually distributed uniformly between the two sheets of covering material by carrying the product between two compression rollers on a long, endless conveyor belt. When the board is made with an open edge special means is employed to hold the plastic material between the covering sheets until it becomes substantially self-sustaining, but when the board is provided with closed edges the turned around margins of the wide sheet are relied on to retain the plastic material properly between the covering sheets. At the time the product is passed between the compression rollers the material forming the core is quite fluid. It requires considerable time for the plastic material to harden sufficiently for it to hold its shape, consequently, if production of the board is to be maintained at a fair rate the belt must travel fairly fast and be of very considerable length. It is not practical to provide means along the edges of the moving board to hold the plastic material properly in between the covering sheets for any considerable distance or until the material hardens sufficiently to be entirely self-sustaining. Until the plastic material hardens sufficiently to become entirely self-sustaining, it tends to sag or settle at its marginal edges and the material tends to bulge out at the edges, consequently, the edges become misshaped and the marginal portions of the board are not of uniform thickness like the main part thereof. One of the objects of my invention is to provide means to engage the side edges of the board, at a point where the plastic material forming the core of the board is in a sufficiently semi-hardened condition to hold its shape but plastic enough to be reshaped, and which is adapted to reshape or square up the edges of the board so that the finished product will have a true edge disposed substantially at a right angle to the face of the board.

I have found that the edge of the board may be reshaped or straightened by providing a shoe positioned at the proper place and disposed substantially at right angles to the face of the board to bear against the edge. Such a shoe, under sufficient pressure, will effectively redistribute the plastic material at the edge of the board so that the edge will be square, but unless some means is provided adjacent the shoe to bear against the upper face of the marginal portion of the board, the portion aforesaid is likely to be left with ridges or uneven places due to the pushing back of the plastic material by the shoe. It is a further object of my invention, therefore, to provide in combination with the shoe aforesaid a shoe disposed at right angles to the first-named shoe and which is adapted to ride on the marginal portion of the upper face of the board to maintain said portion smooth and even.

It is not practical to provide a conveyor belt for the board which operates absolutely true; there is bound to be some movement of the belt first to one side and then to the other. The board is quite heavy and consequently moves laterally with the belt. It is a further object of my invention to provide supporting means for the reshaping members which is of such construction that it will maintain said members under the desired pressure but permit lateral movement thereof to take care of any lateral movement of the belt.

The time required for the plastic mixture to set varies considerably and is largely dependent on the kind, quantity and quality of the several ingredients used. When the plastic material sets quickly it is desirable to place the shoe bearing against the edge of the board under greater pressure than is the case when the material sets slowly. Another object of my invention is to provide means whereby the amount of pressure exerted by the shoe bearing against the vertical edge of the board may be conveniently varied to suit the condition of the product at the time it passes the reshaping device.

The invention consists in the novel constructions, arrangements and devices to be hereinafter described and claimed for carrying out the above stated objects and such other objects as will appear from the following description of a certain preferred embodiment illustrated in the accompanying drawings wherein—

Fig. 1 is a plan view of a fragmentary portion of apparatus embodying the principles of my invention;

Fig. 2 is a side elevational view and Fig. 3 is a perspective view of the apparatus shown in Fig. 1;

Fig. 4 is a detail view, on an enlarged scale, of the parts which engage the edge of the board; and Fig. 5 is a sectional view taken on the line 5—5 of Fig. 4.

Like characters of reference designate like parts in the several views.

Referring now to the accompanying drawings, the wall board comprises a composition core 7 (Fig. 3) which is provided with a top covering sheet of paper 8 and a bottom covering sheet of paper 9, the sheet 9 being of sufficient width to permit its marginal portions 9$^a$ to be turned around the respective edges 10 of the core and to be brought into lapping engagement with the marginal portions of the sheet 8. The wall board is carried forwardly, in the direction indicated by the arrows, on an endless conveyor belt 11 which travels over a suitable support 12.

A supporting member 13 is provided along each side of the conveyor belt (only one being shown). An arm 14 is pivotally mounted on each of the members 13 by a bolt 15. A vertically disposed shoe 16 is fastened to the sides of a pair of inverted U-shaped members 17. The members 17 straddle the forward end of the supporting arm 14 and are fastened thereto by thumb screws 18. The rear end 16$^a$ of the shoe is bent divergently with respect to the edge of the board. A horizontally disposed shoe 19 is positioned adjacent the shoe 16 and is adapted to ride on the marginal portion of the upper face of the board. The shoe 19 is provided with a vertical supporting portion 20, the latter having vertically disposed slots 21 which are adapted to receive the respective ends of bolts 22 which pass through apertures 23 (Fig. 5) provided in the shoe member 16, thumb nuts 22$^a$ being provided on the bolts 22 whereby the shoe member 19 may be raised or lowered relative to the shoe member 16 and secured in the desired position. The portion 19$^a$ at the rear end of the shoe 19 is preferably turned up. A bracket member 24 is fixed to the side of the supporting member 13, the upper end of said bracket member extending substantially vertically and being provided with an open ended slot 24$^a$. One end of a spring 25 is attached to the rear end of the arm 14, the other end of said spring being attached to a chain 26. Any link of the chain may be slipped into the slot 24$^a$ of the bracket member when the link is positioned properly to slip into the slot.

The shaping devices are preferably mounted on the respective sides of the machine at a point sufficiently in advance of the receiving end of the belt that by the time the board reaches the shaping devices the plastic material forming the core thereof will have hardened sufficiently to be self-sustaining and yet plastic enough to be reshaped. The shoe 16 is placed under sufficient tension to redistribute so much of the plastic material at the edge of the board as may be necessary to make the edge true and at substantially a right angle to the face of the board. By loosening the thumb nuts 23 the shoe 19 may be adjusted to bear with sufficient pressure on the marginal portions of the upper face of the board so that said portions will be held to a thickness substantially equal to the other parts of the board and will be left smooth and even. In the case of a board having an enclosed edge the marginal portions of the bottom sheet, which are brought around into lapping engagement with the marginal portions of the top sheet, are held down firmly so that the lapping portions do not become unsealed while the plastic material is being redistributed at the edge of the core. Lateral movement of the traveling belt does not interfere with the proper operation of the shaping members because the pivoted arms readily permit the edge shaping members to move laterally with the traveling board. By hooking the chain 26 at different points to the bracket arm 24 the pressure on the shoe 16 may be varied to suit the condition of the material in the core at the time it passes the shaping elements.

I do not intend to limit my invention to the details of construction shown and described, except only in so far as certain of the appended claims are specifically so limited, as it will be obvious that modifications may be made without departing from the principles of my invention.

I claim:

1. Apparatus for shaping the edge of a product the body of which is in a semi-hardened condition, comprising, in combination, supporting means for the product, shaping means, one of said means being movable relative to the other, yieldable means for maintaining said shaping means in working contact with said edge, and means for adjusting said yieldable means for varying the effective pressure thereby on the edge of the body.

2. Apparatus for shaping the edge of a product the body of which is in a semi-hardened condition, comprising, in combination, supporting means for the product, pivoted means, one of said means being movable forwardly relative to the other, a shaping member mounted on said pivoted means, yieldable means for maintaining said pivoted means so that said shaping member is in working contact with said edge, and means for varying the effective pressure of said yieldable means on the edge of said product.

3. Apparatus for shaping the edge of a product the body of which is in a semi-hardened condition, comprising, in combination, a supporting structure, traveling means on said structure for carrying the product, an arm pivoted on a vertical axis on said structure at one side of the traveling means, a shaping member mounted on said arm and adapted to engage said edge, and resilient means connecting said arm with said structure for holding said shaping member yieldingly in contact with the side edge of the product.

4. Apparatus for shaping the edge of a product the body of which is in a semi-hardened condition, comprising, in combination, a supporting structure, traveling means on said structure for carrying the product, an arm pivoted on said structure, a shaping member mounted on said arm and adapted to engage said edge, resilient means connecting said arm with said structure, and a shoe adjustable vertically on the inner face of said shaping member.

5. Apparatus for shaping the edge of a product the body of which is in a semi-hardened condition, comprising, in combination, a supporting structure, traveling means on said structure for carrying the product, an arm pivoted on a vertical axis on said structure, a shaping member mounted on said arm and adapted to engage said edge, resilient means connected with said arm, and means adjustably connecting said resilient means with said structure for varying the effective pressure of the shaping member against the side edge of the body.

6. An apparatus for shaping the edge of a product the body of which is in a semi-hardened condition, comprising in combination a supporting structure, traveling means on said structure for carrying the product, an arm pivotally mounted on a vertical axis at one side of the traveling carrier and extending forwardly in converging relation with respect to said traveling carrier, shaping means mounted on the forward end of said arm in position to engage the edge of the product on said carrier, and resilient means connected with said arm for holding the shaping means yieldingly in contact with the edge of the product.

7. An apparatus for shaping the edge of a product the body of which is in a semi-hardened condition, comprising in combination a supporting structure, traveling means on said structure for carrying the product, an arm pivotally mounted on a vertical axis at one side of the traveling carrier and extending forwardly in converging relation with respect to said traveling carrier, shaping means in the form of a vertically disposed plate adapted to be held rigidly on the forward end of said arm in position to engage the edge of the product on said carrier, and resilient means connected with said arm for holding the plate yieldingly in contact with the edge of the product.

8. An apparatus for shaping the edge of a product the body of which is in a semi-hardened condition, comprising in combination a supporting structure, traveling means on said structure for carrying the product, an arm pivotally mounted on a vertical axis at one side of the traveling carrier and extending forwardly in converging relation with respect to said traveling carrier, shaping means in the form of a vertically disposed plate adjustable vertically on the forward end of said arm in position to engage the edge of the product on said carrier, and resilient means connected with said arm for holding the plate yieldingly in contact with the edge of the product.

9. An apparatus for shaping the edge of a product the body of which is in a semi-hardened condition, comprising in combination a supporting structure, traveling means on said structure for carrying the product, an arm pivotally mounted on a vertical axis at one side of the traveling carrier and extending forwardly in converging relation with respect to said traveling carrier, shaping means in the form of a vertically disposed plate adapted to be held rigidly on the forward end of said arm in position to engage the edge of the product on said carrier, a shoe in the form of a horizontally disposed plate adjustable vertically on said vertically disposed plate in position to engage the top face of the product on the carrier, and resilient means connected with said arm for holding the vertically disposed plate yieldingly in contact with the edge of the product.

JOHN J. TURNER.